United States Patent [19]

Kobayashi

[11] Patent Number: 4,729,653

[45] Date of Patent: Mar. 8, 1988

[54] METHOD AND APPARATUS FOR MEASURING DISTANCE BY LASER BEAM

[75] Inventor: Takao Kobayashi, Fukui, Japan

[73] Assignee: Shibuya Kogyo Co., Ltd., Ishikawa, Japan

[21] Appl. No.: 831,388

[22] Filed: Feb. 20, 1986

[30] Foreign Application Priority Data

Mar. 28, 1985 [JP] Japan .............................. 60-64310
Mar. 28, 1985 [JP] Japan .............................. 60-64311

[51] Int. Cl.$^4$ ................................................ G01B 9/02
[52] U.S. Cl. ................................... 356/4.5; 356/349; 356/358
[58] Field of Search .................. 356/4.5, 349, 358

[56] References Cited

U.S. PATENT DOCUMENTS 3,588,254  6/1971  Rhoades .............................. 356/358 X

OTHER PUBLICATIONS

Lavan et al., "Heterodyne Interferometer to Determine Relative Optical Phase Changes", *Rev. Sci. Instrum.*, vol. 46, No. 5, pp. 525-527, 5/75.

Grace, "A Laser Calibrator-Compensator to Upgrade the Long-Term Accuracy of a Commercial Laser Interferometer", *Proc. Soc. Photo-Optical Instrum. Eng.* vol. 247, pp. 192-199, 1980.

*Primary Examiner*—Davis L. Willis
*Assistant Examiner*—Matthew W. Koren
*Attorney, Agent, or Firm*—Flynn, Thiel, Boutell & Tanis

[57] ABSTRACT

A method and an apparatus for determining distance by the use of laser beam is disclosed. An optical measuring system which derives a measuring beat wave in a known manner is combined with an optical reference system which derives a reference beat wave for allowing the distance to be determined to a higher precision. An optical measuring system causes laser beam to be reflected from an object being determined and also causes the laser beam to be reflected from a standard reflector which is spaced by a given distance. The both reflected beams are superimposed upon each other to produce a measuring beat wave. The optical reference system causes the laser beam to be refected from a first and a second reference reflector, which are spaced by given distances, to provide reflected beams, which are superimposed upon each other to produce a reference beat wave. A ratio of the number of waves in the measuring beat wave to the number of waves in the reference beat wave is determined, and this ratio is used in combination with known distances to the reflectors to calculate the distance to the object being determined.

8 Claims, 4 Drawing Figures

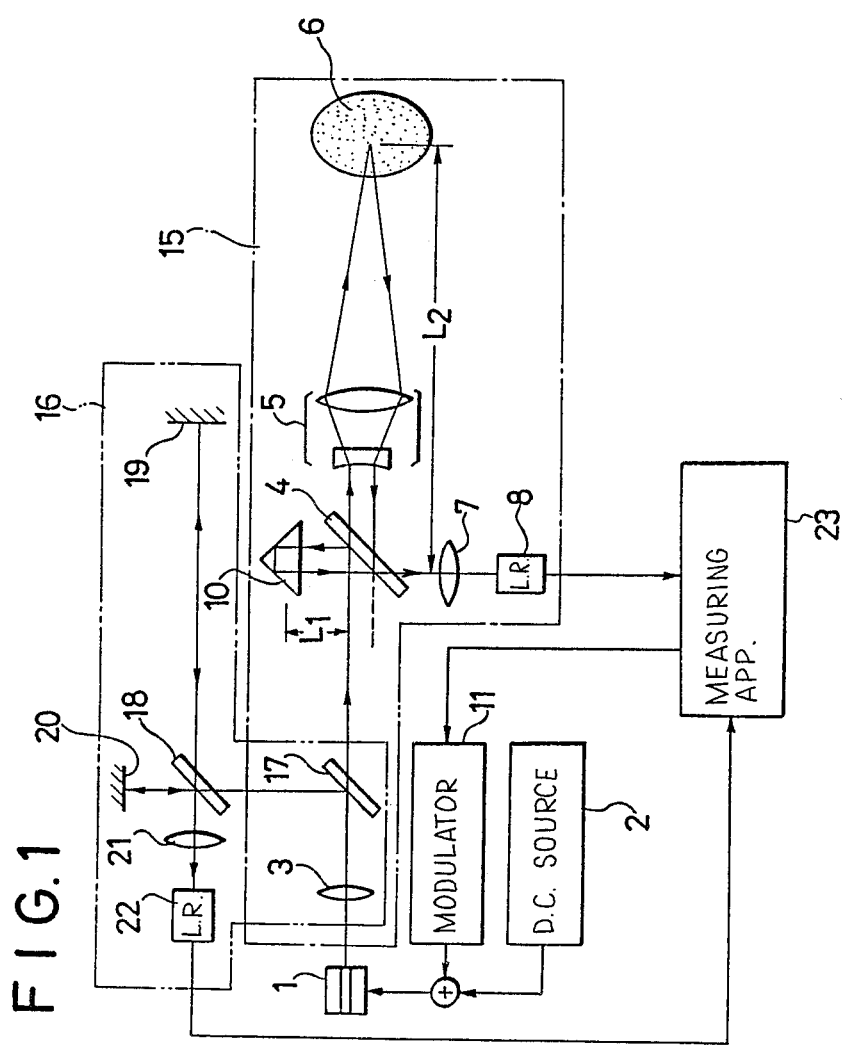

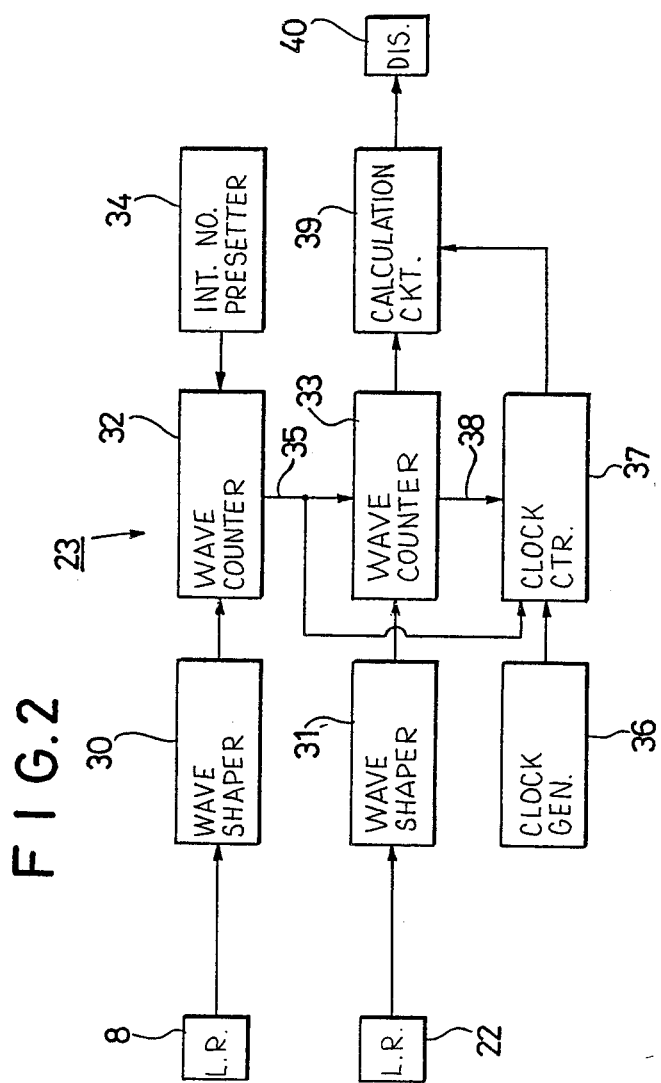

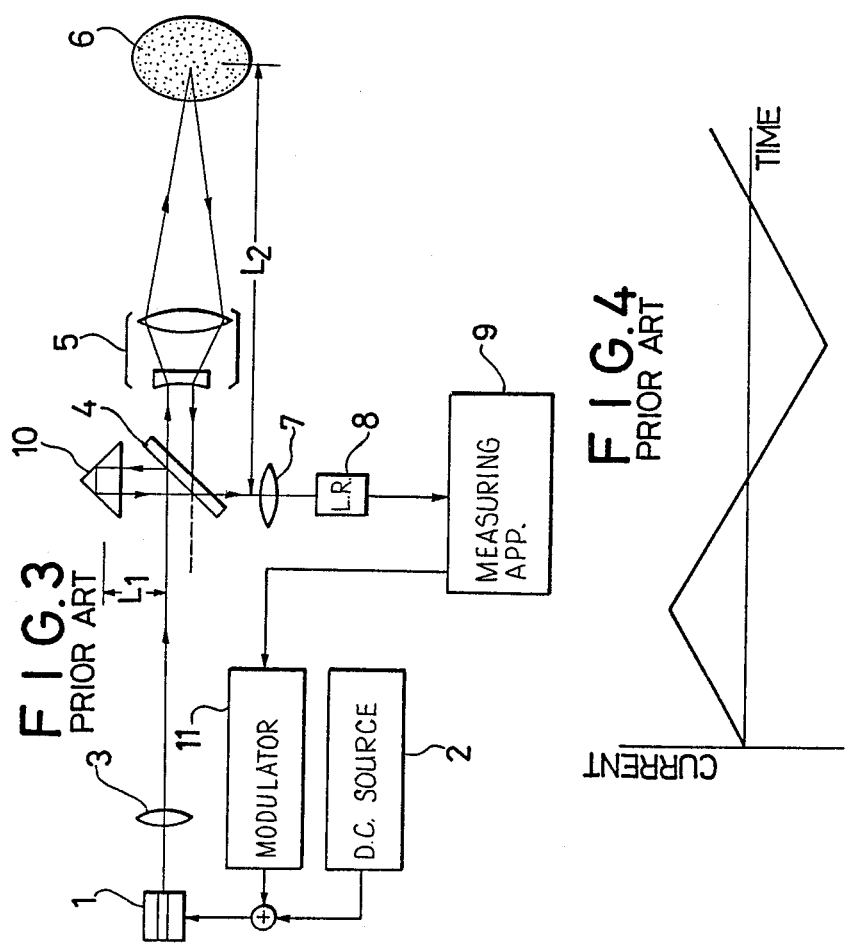

METHOD AND APPARATUS FOR MEASURING DISTANCE BY LASER BEAM

FIELD OF THE INVENTION

The invention relates to a method and an apparatus for measuring distance by utilizing laser beam.

DESCRIPTION OF THE PRIOR ART

A variety of techniques have heretofore been proposed to measure distance by utilizing laser beam. In one technique, an object to be determined is irradiated by laser beam and provides reflected beam. Laser beam is also caused to impinge upon a standard reflector which is spaced by a given distance to provide another reflected beam, which is superimposed upon the first reflected beam. The frequency of the laser beam is modulated, whereupon the superimposed reflected beam produces a measuring beat wave, the frequency of which may be determined to calculate the distance to the object being determined.

When the above technique is employed to determine a distance to an object being determined, it has been necessary in the prior art practice to determine a frequency deviation previously. However, the frequency deviation is susceptible to temperature changes, thus causing an increased error in the results of measurement.

When determining the frequency of the beat wave in order to determine the distance to an object being determined, the accuracy of determination of a frequency has a direct influence upon the precision of measurement of the distance. In the prior art, the beat frequency is determined by using a spectrum analyzer or an oscilloscope. Such means is insufficient to provide a desired precision for determining the phase to within one period. It is highly desirable that the phase within one period or the number of waves which is less than the decimal point be determined to a high precision.

SUMMARY OF THE INVENTION

In view of the foregoing, in accordance with the invention, an optical measuring system which derives the beat wave mentioned above is combined with an optical reference system which produces a reference beat wave. In this manner, a distance to an object being determined can be calculated in a manner free from the value of the frequency deviation.

Specifically, in accordance with the invention, laser beam is caused to irradiate an object being determined to provide reflected beam, and the same laser beam is caused to impinge upon a standard reflector which is spaced a given distance, thus providing another reflected beam, which is superimposed upon the first mentioned reflected beam. The frequency of the laser beam is modulated so that a measuring beat wave is produced from the superimposed reflected beams. On the other hand, the laser beam irradiates a first reference reflector which is spaced by a given distance, thereby providing reflected beam, and also irradiates a second reference reflector which is spaced by another distance, also providing reflected beam, the both reflected beams being superimposed upon each other so that when the frequency of the laser beam is modulated, a reference beat wave is also produced from the superimposed reflected beams. A ratio of the number of waves in the measuring beat wave and the number of waves in the reference beat wave is determined, and this ratio combined with the known distances to the reflectors allows the distance to an object being determined to be calculated.

With this arrangement, the formula which is used to calculate the distance to an object being determined does not include a value of the frequency deviation which represents an element of uncertainty, thus allowing the distance to be determined to a high precision.

In accordance with the invention, when the number of waves in the measuring beat wave and the number of waves in the reference beat wave are determined, a clock which produces a frequency higher than the frequency of one of the beat waves is produced, and clock pulse are counted by a counter. By deriving a ratio of the count in the counter which is reached during a given measuring time interval to the count corresponding to one period, the number of waves in said one beat wave can be determined to a precision better than the decimal point.

Accordingly, when the clock frequency is chosen sufficiently higher than the beat frequency, the number of waves which corresponds to a value less than the decimal point can be determined with a high precision, thus allowing the determination of a distance to a high precision.

Other objects, features and advantages of the invention will become apparent from the following description of an embodiment thereof with reference to the drawings.

BRIEF DESCRIPTION OF THE DRAWINGS

FIG. 1 is a schematic diagram of an arrangement which carries out a method according to one embodiment of the invention;

FIG. 2 is a block diagram of a measuring apparatus shown in FIG. 1;

FIG. 3 is a schematic diagram illustrating the principle of a conventional technique; and FIG. 4 graphically illustrates a current waveform applied to a semiconductor laser.

DETAILED DESCRIPTION OF EMBODIMENT

An embodiment of the invention will now be described with reference to the drawings, but before describing the invention, the principle of a conventional technique on which the invention is based will be described first.

Referring to FIG. 3, a semiconductor laser 1, used as a laser oscillator, is fed from a d.c. source 2 to oscillate in a single mode to produce laser beam. In addition, the oscillation frequency of the laser 1 is modulated in accordance with the magnitude of a drive current. Laser beam produced by the semiconductor laser 1 passes through a convex lens 3, a beam splitter 4 and a lens group 5 including a concave and a convex lens to impinge upon an object 6 being determined which exhibits a rough surface. Reflected beam from the object 6 is initially reflected by the beam splitter 4 and then passes through a convex lens 7 to impinge upon a light receiving element 8 such as photodiode, which produces a signal for application to a measuring apparatus 9.

On the other hand, part of laser beam from the semiconductor laser 1 is reflected by the beam splitter 4 to impinge upon a standard reflector 10 such as a mirror or prism which is spaced by a given distance L1 therefrom. Reflected beam from the standard reflector 10 is transmitted through the beam splitter 4 to be superimposed upon the reflected beam from the object 6, whereupon the combined beam transmits through the convex lens 7 to impinge upon the element 8.

It will be seen that there is a phase difference between the both reflected beams which are introduced into the measuring apparatus 9 because of a time lag caused by a difference in the path lengths. Specifically, the time lag corresponds to twice the difference between the distance L1 measured between the beam splitter 4 and the standard reflector 10 and a distance L2 measured between the beam splitter 4 and the object 6.

Under this condition, the magnitude of a drive current which is supplied to the semiconductor laser 1 from the d.c. source 2 is controlled by a modulator 11 so that a modulating current having a linear waveform as shown in FIG. 4 is applied to the laser 1 to produce a linear modulation of the oscillation frequency in the same manner as the modulating current. Accordingly, the phase difference changes in a manner corresponding to a change in the frequency of the laser beam, thus producing a beat wave.

The purpose of the measuring apparatus 9 is to determine the number of waves Nb in the measuring beat wave, and the beat frequency Nb determined permits the distance to the object 6 to be calculated. Thus, denoting a time difference between the superimposed reflected beams by $\tau$, the difference between the distances L1 and L2 by R and the speed of light by c, the time difference $\tau$ is given as follows:

$$\tau = 2R/c \tag{1}$$

Denoting a frequency deviation with which the laser 1 is modulated by $\delta$, the number of waves Nb in the beat wave can be expressed as follows:

$$Nb = \delta \cdot \tau \tag{2}$$

Accordingly, combining the equations (1) and (2), we have $$R = c \cdot Nb/(2\delta) \tag{3}$$

The frequency deviation $\delta$ can be previously determined when modulating the laser 1, and hence the number of waves Nb in the beat wave which is determined by the measuring apparatus 9 permits the difference R and hence the distance L2 to the object 6 to be calculated according to this equation.

However, as mentioned previously, while the frequency deviation $\delta$ must be previously determined in order to allow the distance to the object 6 to be measured, the deviation $\delta$. is greatly susceptible to variation under the influence of temperature changes, causing an increased error in the measurement.

For this reason, in accordance with the invention, an optical reference system which derives a reference beat wave is incorporated or combined with an optical measuring system which derives the measuring beat wave mentioned above so that the distance L2 to the object 6 can be calculated in a manner free from the influences of the frequency deviation $\delta$. Specifically, according to the method of the invention, the equation (3) is derived from the optical measuring system. Similarly, the optical reference system derives the following relationship:

$$Rr = c \cdot Nr/(2\delta) \tag{4}$$

where Rr represents a difference between the distances to the first and the second reference reflector in the optical reference system, and has a known value. Nr represents the number of waves in the reference beat wave.

By combining the equations (3) and (4), $$R = Rr \cdot Nb/Nr \tag{5}$$

This equation permits the difference R in the distances to be calculated. It will be seen that the equation used for the calculation does not include the frequency deviation $\delta$, which represents an element of uncertainty, thus allowing the determination of a distance to a higher precision.

Referring to FIG. 1 where similar parts to those described above are designated by like numerals as used in FIG. 3, an embodiment of the invention will be specifically described. As shown, the optical measuring system 15 shown in FIG. 3 which is used to derive a measuring beat wave is combined with an optical reference system 16 which derives a reference beat wave.

A laser beam which is introduced into the optical reference system 16 comprises part of laser radiation from the semiconductor laser 1 mentioned above which is derived by a beam splitter 17 disposed intermediate the convex lens 3 and the beam splitter 4 used in the optical measuring system 15. Part of such laser beam is reflected by a beam splitter 18 to impinge upon a first reference reflector 19 such as a mirror or prism which is spaced therefrom by a predetermined distance. The remainder of laser beam transmits through the beam splitter 18 to impinge upon a second reference reflector 20 such as a mirror or prism which is spaced therefrom by another predetermined distance. It is to be noted that the distance between the first reference reflector 19 and the beam splitter 18 is different from the distance between the second reference reflector 20 and the beam splitter 18.

The beam which is reflected by the first reference reflector 19 transmits through the beam splitter 18 and a convex lens 21 to impinge upon a light receiving element 22. On the other hand, the beam which is reflected by the second reference reflector 20 is reflected by the beam splitter 18 to be superimposed upon the reflected beam from the first reference reflector 19, whereupon it transmits through the convex lens 21 to impinge upon the element 22. A signal produced by the element 22 is applied to a measuring apparatus 23, which also receives a signal from the light receiving element 8 associated with the optical measuring system 15.

Accordingly, when the modulator 11 is utilized to modulate laser beam which is output from the semiconductor laser 1 with a modulating current having a linear waveform, a signal representing a measuring beat wave is supplied from the optical measuring system 15 to the measuring apparatus 23 at the same time as a reference beat wave from the optical reference system 16 is supplied to the measuring apparatus 23.

In the present embodiment, the measuring apparatus 23 is arranged to cause the modulator 11 to modulate the frequency of the laser beam over a given measuring time interval, specifically, a time interval which is required for a given number of whole waves in the measuring beat signal to be detected. Accordingly, since the frequency of the measuring beat signal depends on the distance L2 to the object 6, the measuring time interval varies in a manner corresponding to the distance L2. However, in any event, the number of waves in the measuring beat wave which corresponds to an unknown measuring time is chosen to be a predetermined constant.

On the other hand, the measuring apparatus 23 begins counting the number of waves in the reference beat signal at the same time it begins counting the number of waves in the measuring beat wave, and when it has counted a given, integral number of whole waves in the measuring beat waves or when the unknown measuring time has passed, it stops counting the number of waves in the reference beat wave. Usually, such number of waves in the reference beat signal will not be equal to an integral number, but the measuring apparatus 23 is arranged to determine the number of waves in the reference beat signal to a precision which is better than the decimal point.

When the number of waves in the measuring beat signal and the number of waves in the reference beat signal counted during the unknown measuring time, and hence the ratio of the both numbers of waves is obtained, it is possible to calculate the distance L2 to the object 6 according to the equation (5) if the measuring time remains unknown.

FIG. 2 is a block diagram illustrating a specific arrangement of the measuring apparatus 23. Specifically, the apparatus 23 includes a pair of waveform shapers 30, 31 which receive the reference beat signal and the measuring beat signal from the respective light receiving elements 8, 22 to provide a shaping operation thereon. The shaped signals are fed to a pair of corresponding whole wave counters 32, 33, each of which operates to count the number of whole waves in each beat wave.

The counter 32 which receives the measuring beat signal is connected to an integral number presetter 34, and when the counter 32 has counted an integral number of whole waves in the measuring beat signal which is preset by the presetter 34, the counter 32 then delivers a count command signal 35 which is applied to the counter 33 associated with the reference system, thus interrupting a counting operation of the number of waves in the reference beat signal by the counter 33.

It will be seen that the counter 33 has then been capable of only counting an integral number of whole waves in the reference beat wave. To determine a number of waves which is less than the decimal point, there is provided a clock generator 36. The clock generator 36 produces a clock of a far higher frequency than the frequency of the reference beat wave, and such clock is counted by a clock counter 37.

Each time the counter 33 counts a whole wave in the reference beat wave, it delivers a reset signal 38 which is applied to the counter 37 to reset it. When the counter 32 associated with the measuring system has delivered the count stop command signal 35, this signal is also applied to the clock counter 37 to interrupt the counting operation thereof. Under this condition, it will be seen that the clock counter 37 has a count which corresponds to a number of waves contained within one period or a number of waves less than the decimal point.

The distance to the reference reflectors 19, 20 are maintained constant, and hence there cannot be any change in the frequency of the beat signal. Accordingly, the clock counter 37 has a given count for one period of the reference beat signal. As a result, a count in the clock counter 37 which is obtained when the count stop command signal 35 is delivered can be compared against the count corresponding to one period, thereby allowing a number of waves less than the decimal point to be determined for the reference beat signal. Such calculation to determine a number of waves less than the decimal point is performed by a calculation circuit 39. By supplying the count in the counter 33 and the count in the clock counter 37 to the calculation circuit 39, the latter can calculate the distance L2 to the object 6, which can be displayed on a display 40. Accordingly, the display 40 is capable of indicating the number of waves in the reference beat wave thus calculated to a precision which is better than the decimal point.

In the described embodiment, the counter 33 operates to reset the clock counter 37 every time it has counted a whole wave in the reference beat wave. However, alternatively, it may operate to count a total number of waves over the measuring time.

In the described embodiment, both the number of waves in the measuring beat signal and the number of waves in the reference beat signal are directly determined to derive a ratio therebetween. However, both the frequency of the measuring beat signal and the frequency of the reference beat signal may be determined by a suitable frequency measuring unit to provide a ratio of the both frequencies, which may be used to derive a ratio between the number of waves in the measuring beat signal and the number of waves in the reference beat signal indirectly. Furthermore, by performing a two-dimensional sweep of points to be determined in X-Y directions to calculate the distance to these points, it is also possible to determine a three-dimensional configuration of an object being determined.

While the invention has been illustrated and described above in connection with a certain embodiment thereof, it should be understood that a number of changes, modifications and substitutions therein will readily occur to one skilled in the art without departing from the scope and spirit of the invention.

What is claimed is:

1. A method of determining an unknown distance to an object by the use of a laser beam, comprising:
    causing a first portion of the laser beam to travel over the unknown first distance to the object, be reflected from the object, and return over said unknown first distance as a first reflected beam;
    causing a second portion of the laser beam to travel over a given second distance, be reflected from a standard reflector, and return over said given second distance as a second reflected beam;
    superimposing the first and second reflected beams upon each other;
    modulating the frequency of the laser beam to cause the superimposed reflected beams to produce a measuring beat wave;
    causing a third portion of the laser beam to travel over a given third distance, be reflected from a first reference reflector, and return over said given third distance as a third reflected beam;
    causing a fourth portion of the laser beam to travel over a given fourth distance, be reflected from a second reference reflector, and return over said given fourth distance as a fourth reflected beam;
    superimposing the third and the fourth reflected beam upon each other, and thereby producing a reference beat wave due to said modulating of the frequency of the laser beam;
    determining a ratio of the number of waves in the measuring beat wave to the number of waves in the reference beat wave; and using the ratio of the numbers of waves and known distances to the reflectors to calculate said unknown first distance to the object.

2. A method according to claim 1, in which said step of determining a ratio further includes the steps of producing a clock of a frequency which is higher than the frequency of a first beat wave, said first beat wave representing one of the measuring beat wave and reference beat wave, providing a clock counter which counts the clock, determining a ratio of a count in the clock counter which is reached during a given measuring time interval for the first beat wave to a count corresponding to one period of said first beat wave, and using the latter ratio to calculate the whole number of waves, and a fraction of a wave if present, in the first beat wave.

3. A method according to claim 2 in which the measuring time interval is chosen equal to a time interval which is required to count an integral number of whole waves in a second beat wave which represents the other of the measuring and the reference beat wave.

4. A method according to claim 1 in which said first, second, third and fourth distances are not all the same.

5. An apparatus for determining an unknown first distance to an object by the use of laser beam, comprising:

a laser oscillator having an oscillation frequency which can be modulated;

means defining an optical measuring system for
  (1) causing a first portion of the laser beam to travel over the unknown first distance to the object, be reflected from the object and return over the unknown first distance as a first reflected beam and
  (2) causing a second portion of the laser beam to travel over a given second distance, be reflected from a standard reflector, and return over said given second distance to provide a second reflected beam and
  (3) superimposing the first and the second reflected beams upon each other to produce a measuring beat wave;

means defining an optical reference system for
  (1) causing third and fourth portions of the laser beam to travel over respective predetermined third and fourth distances, be reflected from respective first and a second reference reflectors and return over said respective distances to provide respective third and fourth reflected beams and
  (2) superimposing the third and the fourth reflected beams upon each other to produce a reference beat wave; and means defining a measuring apparatus for (1) determining the number of waves in each of the measuring beat wave and the reference beat wave produced by the respective optical systems and (2) deriving a ratio between the number of waves to calculate said unknown distance to the object on the basis of the ratio and said known distances to the reflectors.

6. An apparatus according to claim 5 in which the measuring apparatus includes a whole wave counter for counting an integral number of whole waves in a second beat wave, which second beat wave represents at least one of the measuring beat wave and reference beat wave, a clock generator for producing a clock of a frequency which is higher than the frequency of a first beat wave, which first beat wave represents the other of the measuring beat wave and reference beat wave, and a clock counter for counting the clock produced by the clock generator, the whole wave counter defining means effective, when it has counted a given number of whole waves in the second beat wave, to interrupt a counting operation by the clock counter, such that the count in the clock counter at the time its counting operation is interrupted is comparable to a count of the clock counter which corresponds to one period of the first beat wave in order to calculate the number of waves in the first beat wave.

7. An apparatus according to claim 6 in which the measuring apparatus includes first and second ones of said whole wave counters respectively operable to count the number of whole waves in the first beat wave and second beat wave, means connecting the first whole wave counter to reset the clock counter each time it counts a whole wave in the first beat wave, the clock counter being of a type which upon being reset thereupon starts to count the clock again, means connecting the second whole wave counter to the clock counter such that a given number of whole waves in the second beat wave counted by the second whole wave counter is effective to interrupt a counting operation by the clock counter, calculation means for calculating the number of waves in the first beat wave from the count retained by the first whole wave counter as well as the count in the clock counter which is retained when its counting operation is interrupted and the count in the clock counter which corresponds to one period of the first beat wave.

8. An apparatus according to claim 5 in which the laser oscillator comprises a semiconductor laser.

* * * * *